United States Patent
Ahearn

(10) Patent No.: US 9,759,375 B2
(45) Date of Patent: Sep. 12, 2017

(54) ADJUSTABLE SHELF

(71) Applicant: David J. Ahearn, Little Compton, RI (US)

(72) Inventor: David J. Ahearn, Little Compton, RI (US)

( * ) Notice: Subject to any disclaimer, the term of this patent is extended or adjusted under 35 U.S.C. 154(b) by 0 days.

(21) Appl. No.: 15/067,930

(22) Filed: Mar. 11, 2016

(65) Prior Publication Data

US 2016/0296007 A1     Oct. 13, 2016

Related U.S. Application Data

(60) Provisional application No. 62/132,350, filed on Mar. 12, 2015.

(51) Int. Cl.
  *F16M 13/02*      (2006.01)
  *A47B 96/02*      (2006.01)
  *A47B 21/03*      (2006.01)

(52) U.S. Cl.
  CPC ......... *F16M 13/022* (2013.01); *A47B 96/028* (2013.01); *A47B 2021/0321* (2013.01); *F16M 2200/024* (2013.01)

(58) Field of Classification Search
  CPC . A47B 21/0314; A47B 57/045; A47B 96/028; A47B 46/00; A47B 2021/0321; A47B 57/04; A47B 63/00; A47B 96/066; A47B 96/07; A47B 37/00; F16M 13/022; F16M 2200/024
  USPC ......................................................... 211/26
  See application file for complete search history.

(56) References Cited

U.S. PATENT DOCUMENTS

| | | | | | |
|---|---|---|---|---|---|
| 1,683,944 | A | * | 9/1928 | Balch ..................... | A47B 23/02 108/141 |
| 3,179,071 | A | * | 4/1965 | Johnston .................. | A47B 9/14 108/139 |
| 4,307,672 | A | * | 12/1981 | Shikimi ................. | A47B 96/07 108/139 |
| 4,387,650 | A | * | 6/1983 | Pizzi .................... | A47B 17/033 108/39 |
| 4,413,868 | A | * | 11/1983 | Gorkiewicz ........... | A47B 96/16 248/282.1 |
| 4,754,945 | A | * | 7/1988 | Diamond ............... | A47B 23/00 248/279.1 |
| 5,221,070 | A | * | 6/1993 | Heilmer .................. | A47C 7/70 248/447.1 |

(Continued)

*Primary Examiner* — Korie H Chan
(74) *Attorney, Agent, or Firm* — Adler Pollock & Sheehan P.C.; Daniel J. Holmander

(57) ABSTRACT

An adjustable shelf includes a wall mount for coupling to a wall. A fixed post extends downwardly from the wall mount along a first axis. A post assembly has a rotatable tube coupled to the fixed post so that the rotatable tube rotates about the first axis. An arm extends from the rotatable tube along a second axis substantially perpendicular to the first axis. A shaft rotatably couples within the arm and extends from the arm along the second axis, the shaft being rotatable about the second axis between an operational orientation and a storage orientation. A tray extends from the shaft for holding a keyboard. In the storage orientation, the tray is substantially parallel to the wall and, in the operational orientation, the tray is at an angle with respect to the wall. A locking assembly selectively fixes the tray in the operational orientation and the storage orientation.

12 Claims, 18 Drawing Sheets

(56) References Cited

U.S. PATENT DOCUMENTS

| | | | | |
|---|---|---|---|---|
| 5,251,959 A | * | 10/1993 | De Braal | B60N 2/062 |
| | | | | 297/248 |
| 5,647,636 A | * | 7/1997 | Allen | A47C 9/06 |
| | | | | 248/285.1 |
| 7,585,033 B2 | * | 9/2009 | Holt | A47B 37/00 |
| | | | | 108/138 |
| 7,942,364 B2 | * | 5/2011 | Yu Chen | B65H 75/241 |
| | | | | 242/578.2 |
| 9,027,486 B1 | * | 5/2015 | Berkovitz | B60N 2/468 |
| | | | | 108/40 |
| 2014/0263128 A1 | * | 9/2014 | Garrett | A47F 5/0087 |
| | | | | 211/144 |

* cited by examiner

ADJUSTABLE SHELF

CROSS-REFERENCE TO RELATED APPLICATION

This application claims priority to U.S. Provisional Patent Application No. 62/132,350, filed Mar. 12, 2015, which is incorporated herein by reference.

BACKGROUND OF THE INVENTION

Field of the Invention

The subject technology invention relates to a shelf for use in a medical environment, in particular a shelf that is ADA compliant and is useful for supporting working materials and computer accessories when in use, and capable of low profile storage when not in use.

Background of the Related Art

In the modern office, space, storage and ergonomics are all at a premium. An efficient organization of the work space creates not only a cost effective environment but a positive and productive environment as well. This is particularly true in the health care field in which patients in varying degrees of discomfort and malady regularly pass.

SUMMARY

In view of the above, a need exists to improve upon the availability, storage and use of office equipment. These needs are particularly apparent in a dental operating room, in which there is limited space.

One embodiment of the subject technology is directed to an adjustable shelf including a wall mount for coupling to a wall. A fixed post extends downwardly from the wall mount along a first axis. A post assembly has a rotatable tube coupled to the fixed post so that the rotatable tube is rotatable about the first axis. An arm extends from the rotatable tube along a second axis substantially perpendicular to the first axis, wherein the first and second axis are substantially parallel to the wall. A shaft rotatably couples to the arm and extends from the arm along the second axis, the shaft being rotatable about the second axis between an operational orientation and a storage orientation. A tray extends from the shaft.

Preferably, the adjustable shelf has a housing enshrouding the wall mount. The tray may have an upper working surface for supporting an item, a rear edge secured to the shaft, and a front lip for retaining the item on the tray. The tray has an upper working surface for mounting a keyboard thereto. The adjustable shelf can also have a locking assembly for fixing the tray in the operational orientation. The shelf can simply hang down in the storage orientation or the locking assembly can fix the tray in the storage orientation. The lock assembly includes a locking button secured to one of: the shaft and the arm; and a slot defined on the other of: the shaft and the arm, the slot defining an operational detent for each orientation so that when the locking button is in one of the operational detents, the tray is fixed in the respective orientation. The operational detent for the operational orientation may set the tray horizontally, at a downward angle from the wall or at an upward angle. The slot may have a plurality of detents for setting two or more different operational orientations. The wall mount extends from the wall a certain depth and, in the storage orientation, the tray is within the certain depth from the wall.

Another embodiment of the subject technology is directed to an adjustable shelf including a wall mount for coupling to a wall, wherein the wall mount extends from the wall a certain depth. A housing encloses the wall mount with a fixed post extending downwardly from the wall mount along a first axis. A post assembly has a rotatable tube coupled to the fixed post so that the rotatable tube is rotatable about the first axis. A hollow arm extends from the rotatable tube along a second axis substantially perpendicular to the first axis, wherein the first and second axis are substantially parallel to the wall. A shaft rotatably couples within the hollow arm and extends from the arm along the second axis, the shaft being rotatable about the second axis between an operational orientation and a storage orientation. A tray has an upper working surface extending from the shaft for mounting a keyboard thereto. In the storage orientation, the tray is substantially parallel to and within the certain depth from the wall and, in the operational orientation, the tray is at a downward angle with respect to the wall. A locking assembly selectively fixes the tray in the operational orientation and the storage orientation, wherein the lock assembly includes a locking button secured to one of: the shaft and the arm; and a slot defined on the other of: the shaft and the arm. The slot defines an operational detent so that when the locking button is in the operational detent, the tray is fixed in the operation orientation.

The adjustable shelf may also be configured such that the tray has a rear edge secured to the shaft and a front lip for retaining the keyboard on the tray. The slot can define a storage detent so that when the locking button is in the storage detent, the tray is fixed in the storage orientation. The downward angle sets the tray slightly below horizontal.

The subject technology provides an adjustable shelf. More particularly, the subject technology provides a shelf that has a rotatable tray that can be rotated to a first orientation (working orientation, or working position) in which the tray provides a work surface that is useful for supporting objects for a user, and that can be rotated to a second orientation (storage orientation, or storage position) in which the tray extends parallel to a wall in a room so that it takes up minimal space in the room when not in use.

An exemplary embodiment of the adjustable shelf has a wall mount that is configured to be secured to a wall in a room, such as a dental operating room or another room. A housing is securable to the wall mount, and the housing is configured to enshroud the wall mount. A housing post extends from the housing, and the housing post supports a rotatable tube. The rotatable tube has a receiver for receiving the housing post. The rotatable tube is rotatable with respect to the housing, about a first axis. In an exemplary embodiment, the first axis is an at least substantially vertical axis.

A tray provides a rotatable working surface for a user, and is preferably dimensioned and configured as a keyboard tray for supporting a computer keyboard. The tray is supported by an arm that is secured to the rotatable tube. The arm extends laterally from the rotatable tube along a second axis. The shaft extends laterally from the arm along the second axis, and the shaft is rotatable about the second axis between a first orientation and a second orientation. In an exemplary embodiment, the second axis is a substantially horizontal axis. The tray extends from the shaft. The tray has an upper working surface, a front edge, a rear edge, a left edge, and a right edge. The tray is secured to the shaft at its rear edge. A front lip extends along the front edge of the tray. The front lip is useful for retaining items on the upper surface of the tray when the tray is in use by a user.

In the first orientation, the upper surface of the tray extends at an angle with respect to the wall on which wall mount is secured. In the second orientation, the upper working surface extends at least substantially vertically, so that the upper working surface is substantially parallel to the wall on which the wall mount is secured.

An exemplary embodiment of the adjustable shelf also includes a lock configured to allow a user to selectively lock the shaft in the first orientation. The lock may also be configured to allow a user to selectively lock the shaft in the second orientation. An exemplary embodiment of the adjustable shaft includes a locking button formed on either the shaft or the arm, and a slot defined on the other of the shaft or the arm. The locking button is moveable relative to the slot, so that when the post engages the slot, the shaft is rotatably locked with respect to the arm.

In an exemplary embodiment, the tray has an upper surface that is dimensioned and configured to support a typical computer keyboard for use with a desktop computer.

In an exemplary embodiment, the depth of the housing is configured so that the rotatable tube does not extend forwardly of the front housing edge when the wall mount is secured to a substantially vertical wall, and the tray does not extend forwardly of the front housing edge when the wall mount is secured to a substantially vertical wall.

Accordingly, among the objects of the subject technology are: the provision of an adjustable shelf that allows a user to rotate a tray to a stowed orientation in which the tray is substantially parallel to a wall and substantially out of the way of the user; the provision of an adjustable shelf that allows a user to rotate a tray to a working orientation in which the tray is oriented so its upper surface extends at an angle so that the upper surface is useful for supporting working materials for a user; the provision of an adjustable shelf that is useful for supporting a computer keyboard; and the provision of an adjustable shelf that has a selective locking mechanism.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
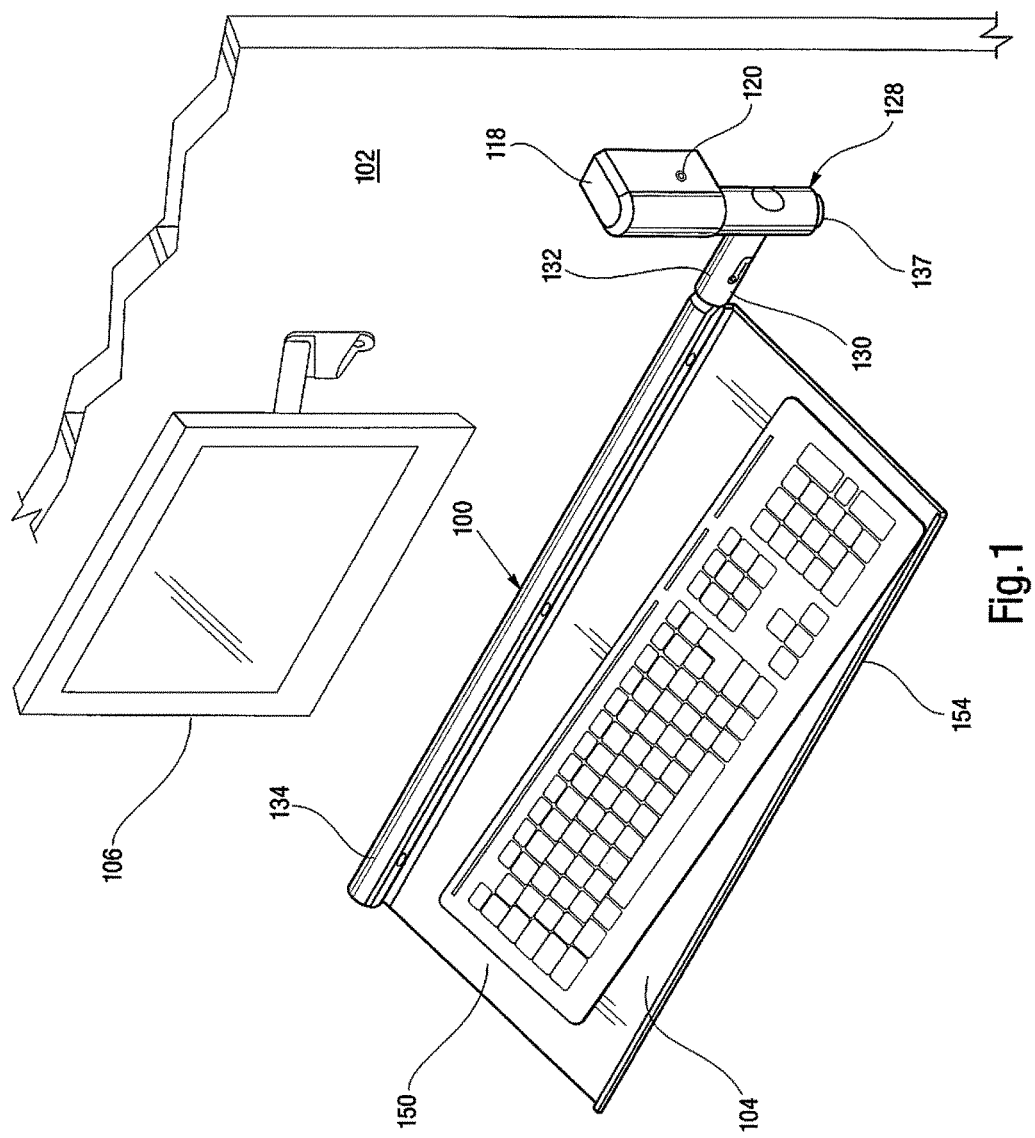
FIG. 1 is a perspective front view of a shelf assembly mounted to a wall in accordance with the subject disclosure.
Figure 2:
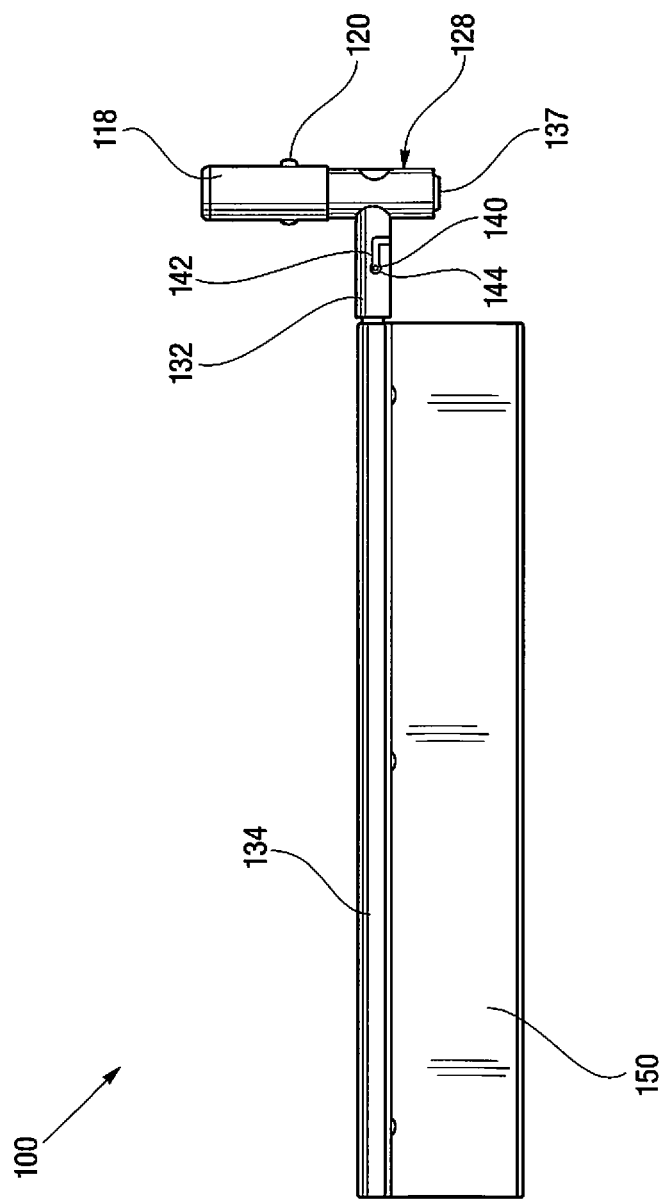
FIG. 2 is a front view of a shelf assembly in the operational orientation in accordance with the subject disclosure.
Figure 3:
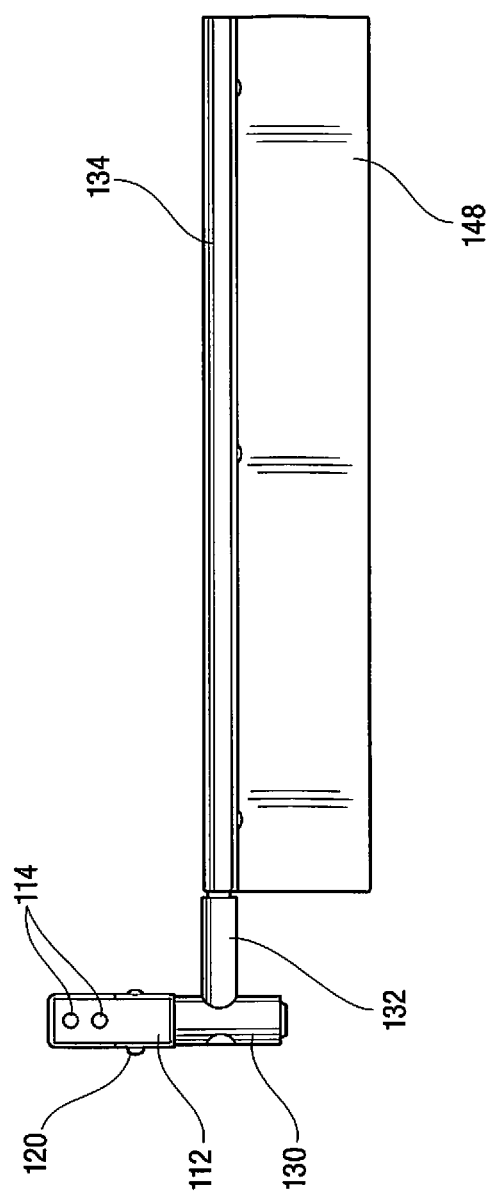
FIG. 3 is a back view of a shelf assembly in the operational orientation in accordance with the subject disclosure.
Figure 4:
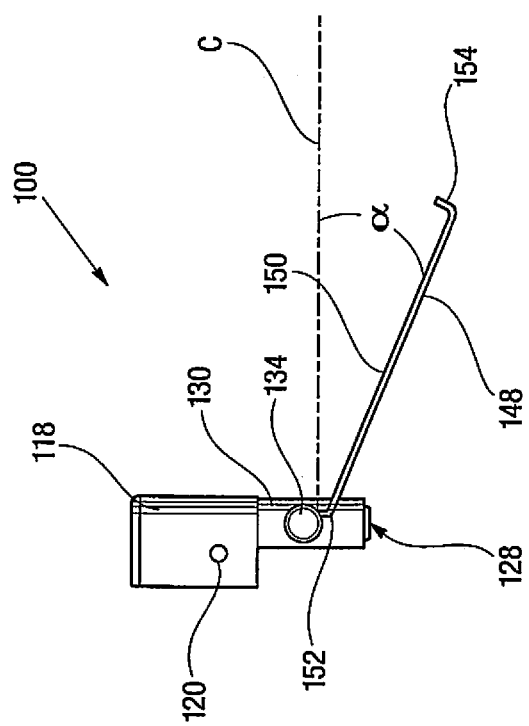
FIG. 4 is a left view of a shelf assembly in the operational orientation in accordance with the subject disclosure.
Figure 5:
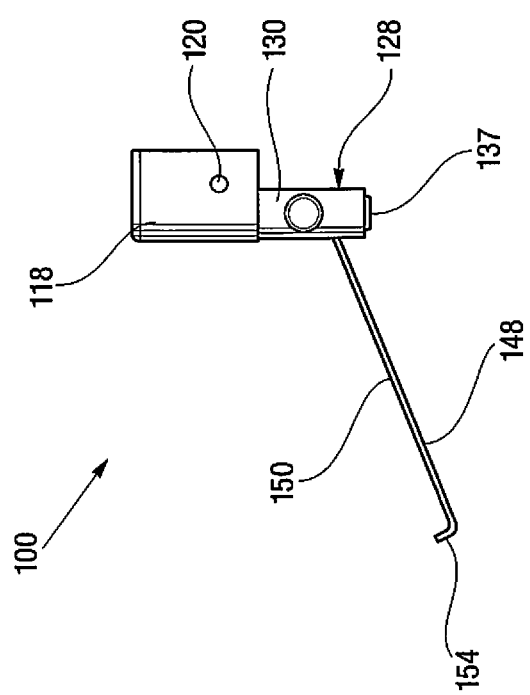
FIG. 5 is a right view of a shelf assembly in the operational orientation in accordance with the subject disclosure.
Figure 6:
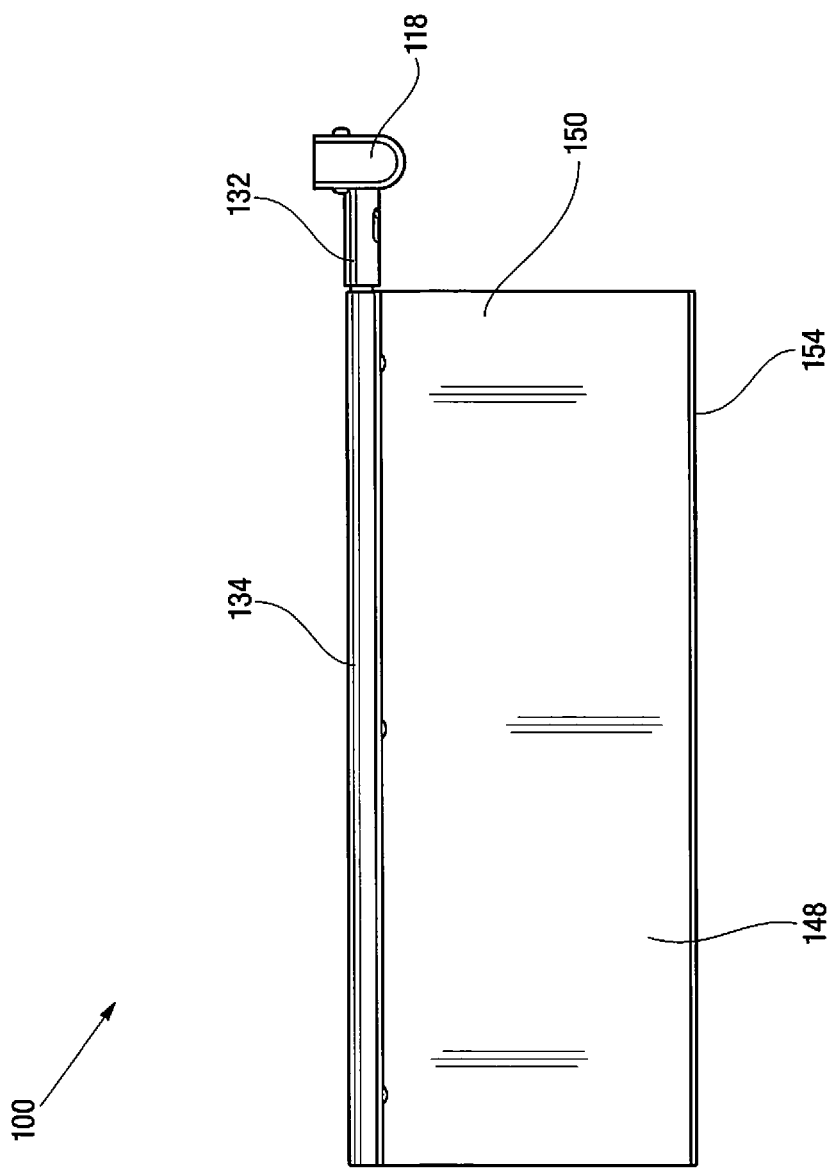
FIG. 6 is a top view of a shelf assembly in the operational orientation in accordance with the subject disclosure.
Figure 7:
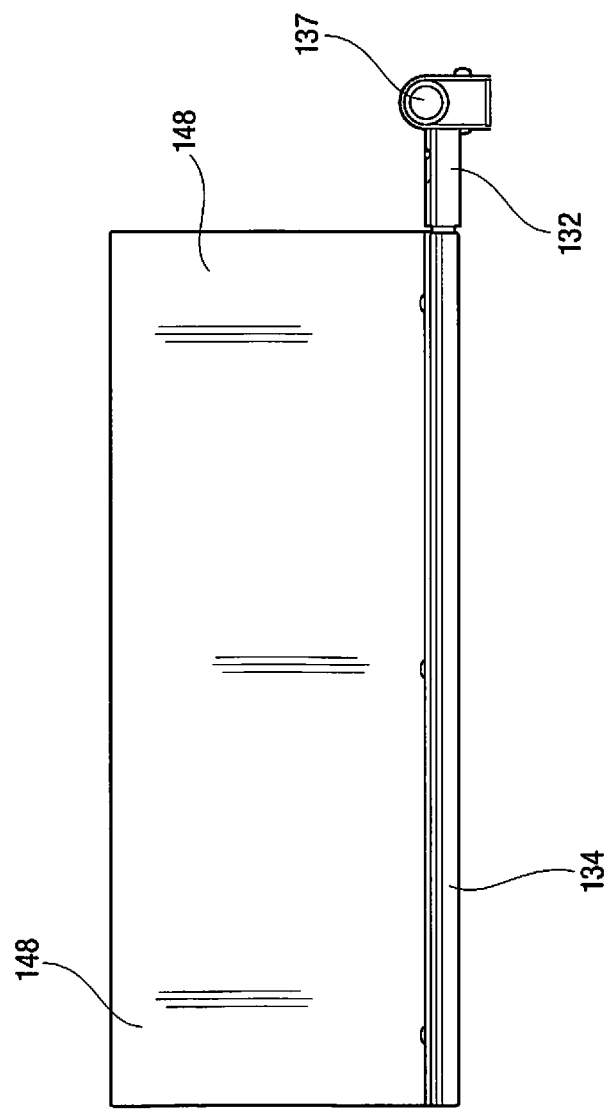
FIG. 7 is a bottom view of a shelf assembly in the operational orientation in accordance with the subject disclosure.
Figure 8:
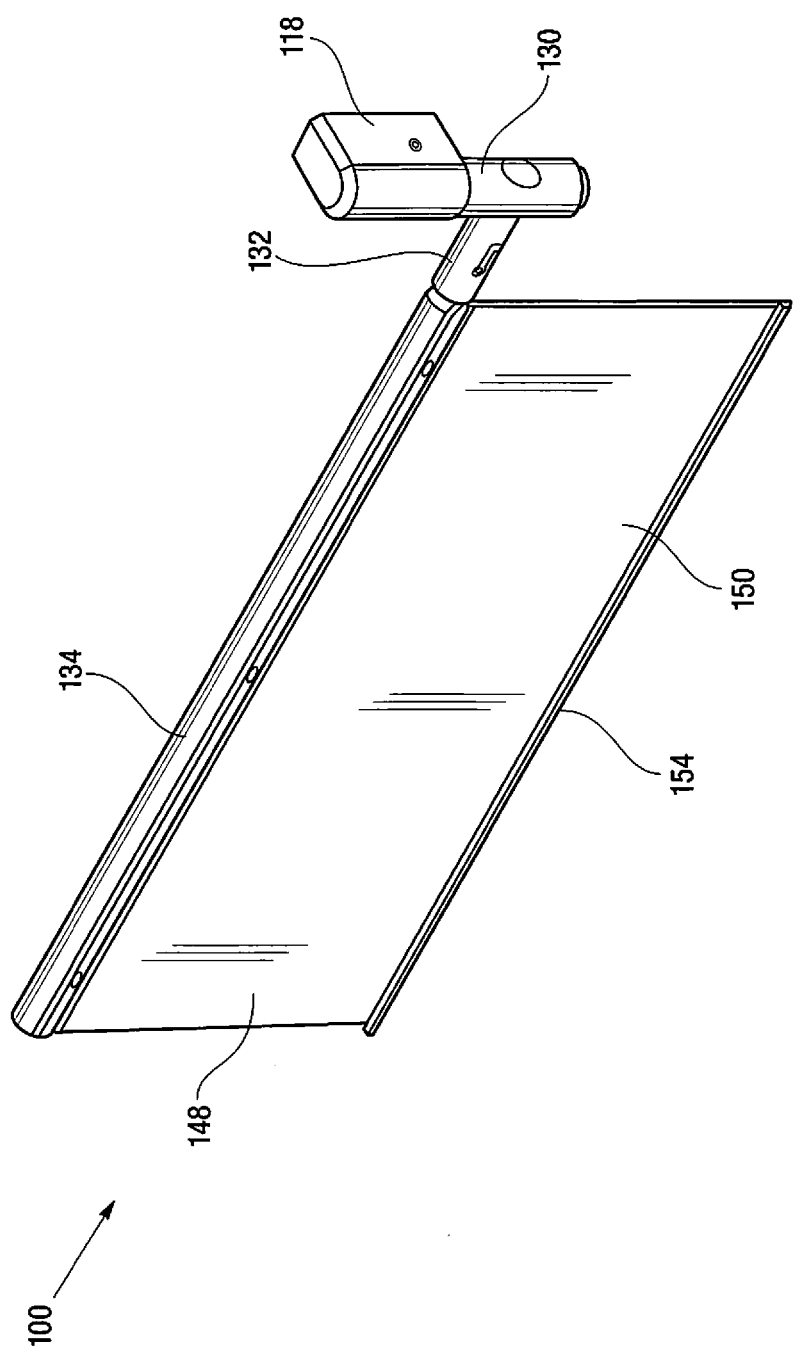
FIG. 8 is a perspective front view of a shelf assembly in the storage orientation in accordance with the subject disclosure.
Figure 9:
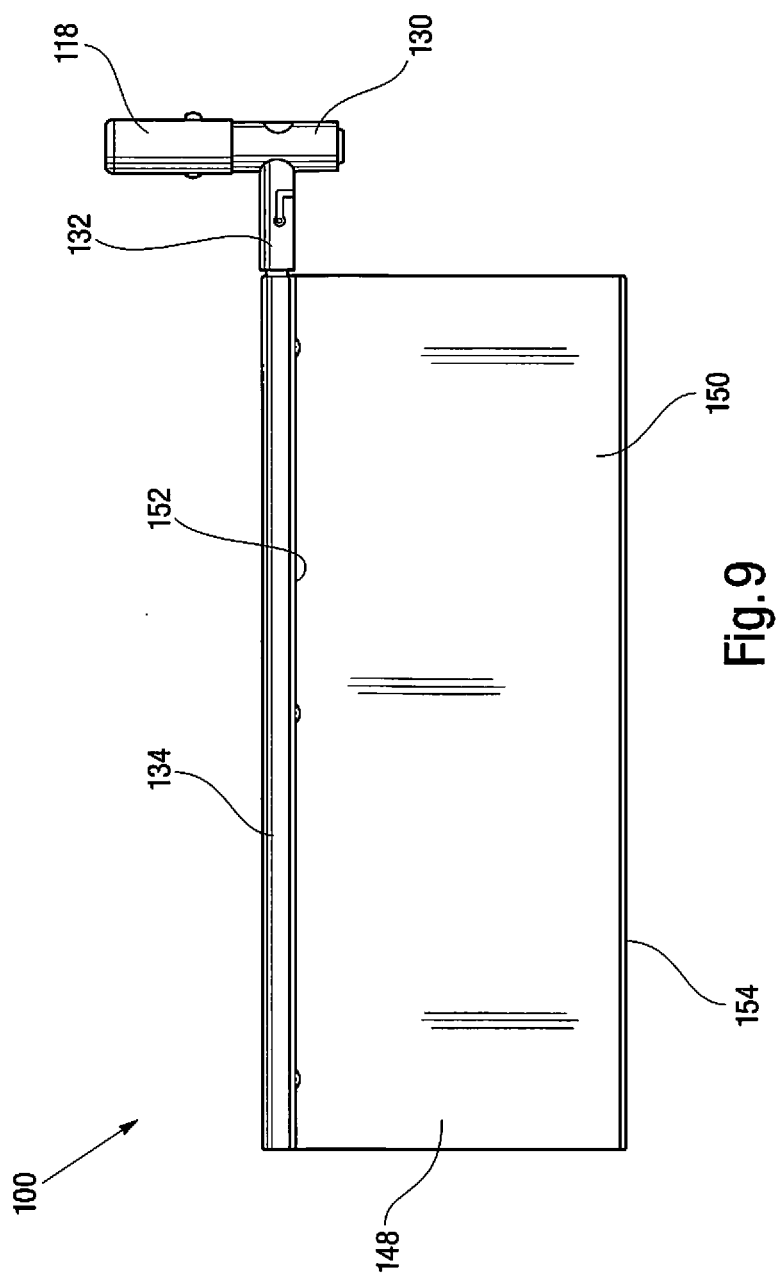
FIG. 9 is a front view of a shelf assembly in the storage orientation in accordance with the subject disclosure.
Figure 10:
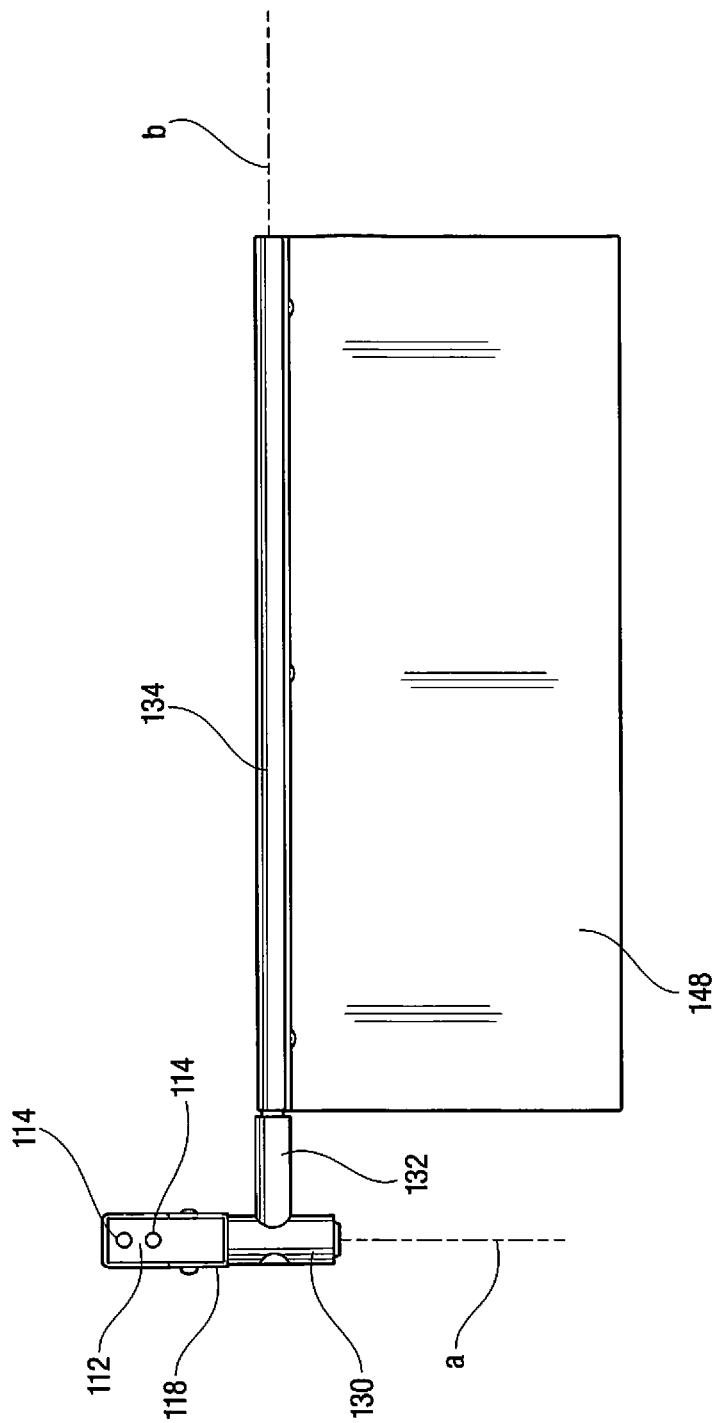
FIG. 10 is a back view of a shelf assembly in the storage orientation in accordance with the subject disclosure.
Figure 11:
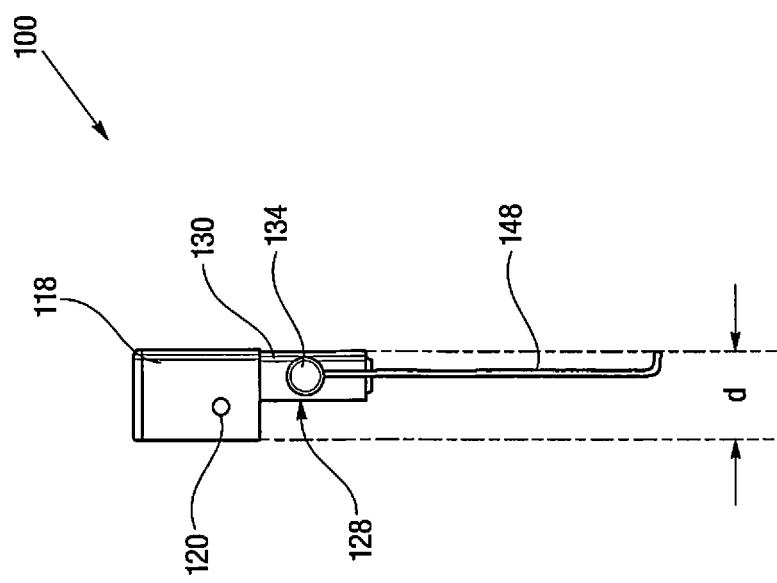
FIG. 11 is a left view of a shelf assembly in the storage orientation in accordance with the subject disclosure.
Figure 12:
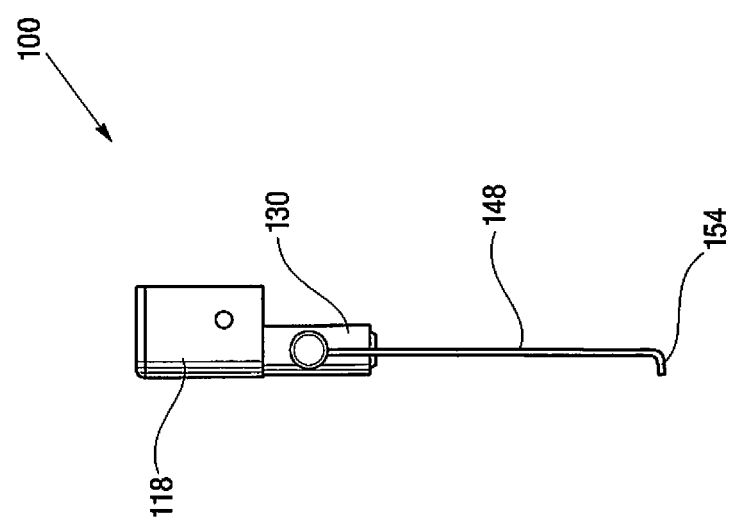
FIG. 12 is a right view of a shelf assembly in the storage orientation in accordance with the subject disclosure.
Figure 13:
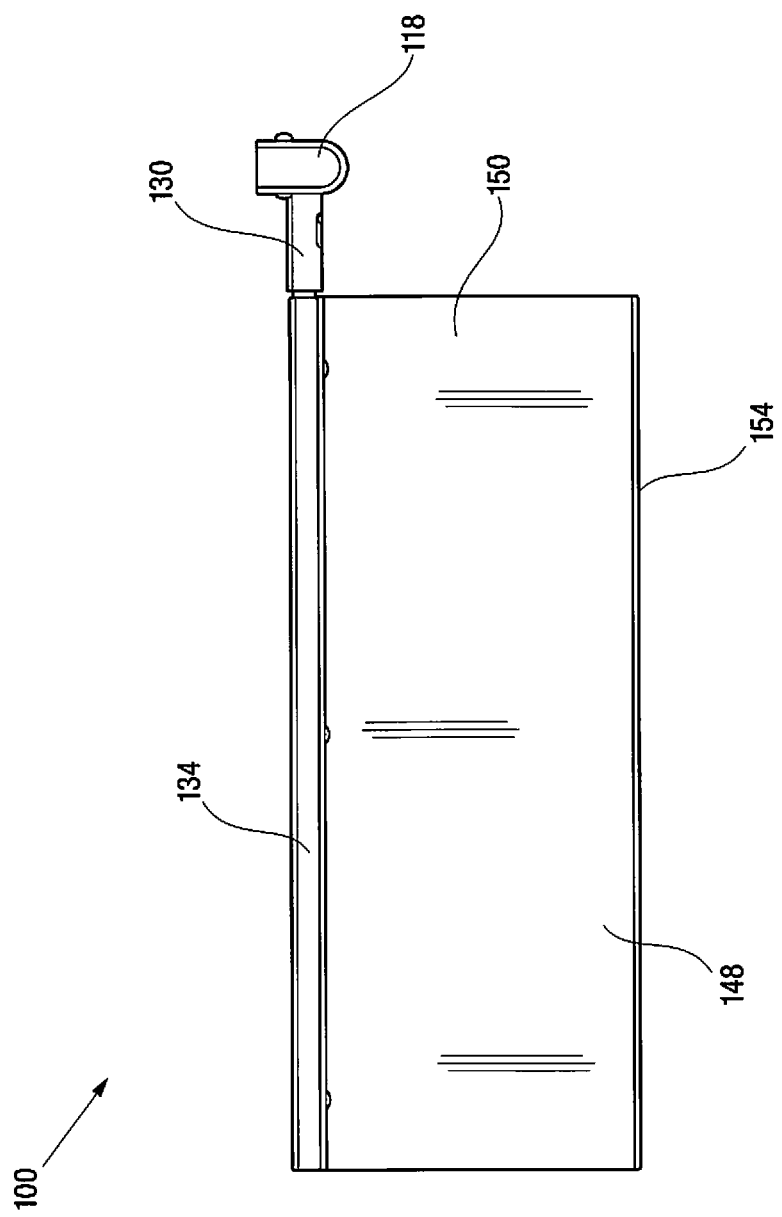
FIG. 13 is a top view of a shelf assembly in the storage orientation in accordance with the subject disclosure.
Figure 14:
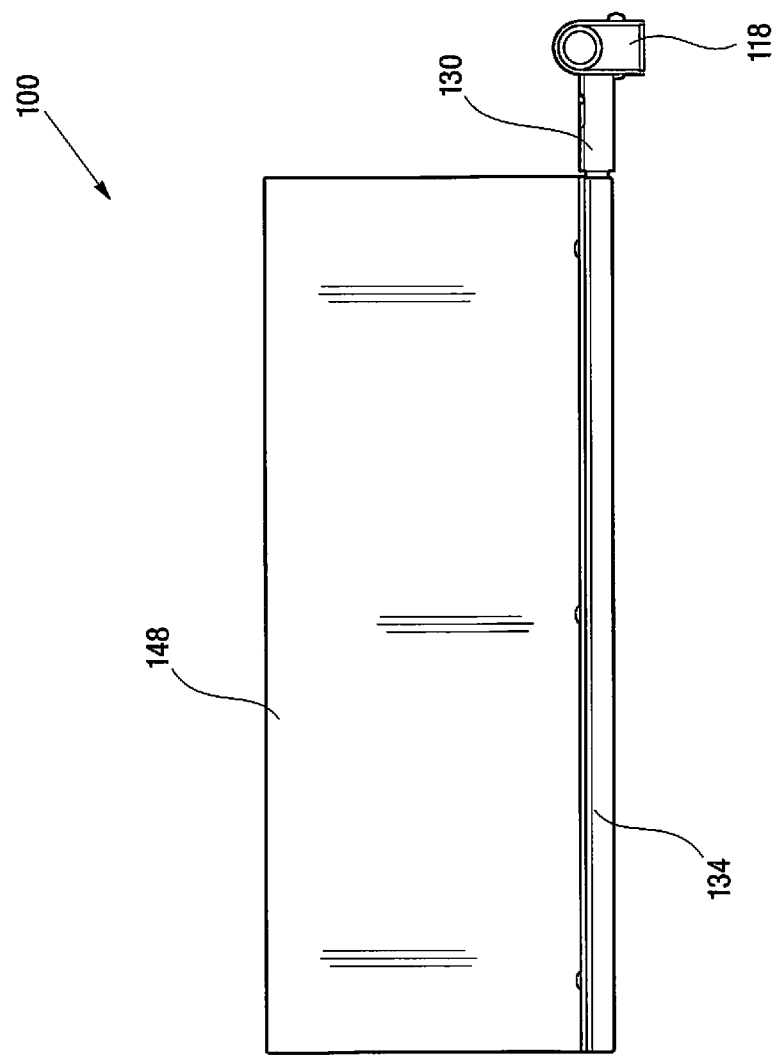
FIG. 14 is a bottom view of a shelf assembly in the storage orientation in accordance with the subject disclosure.
Figure 15:
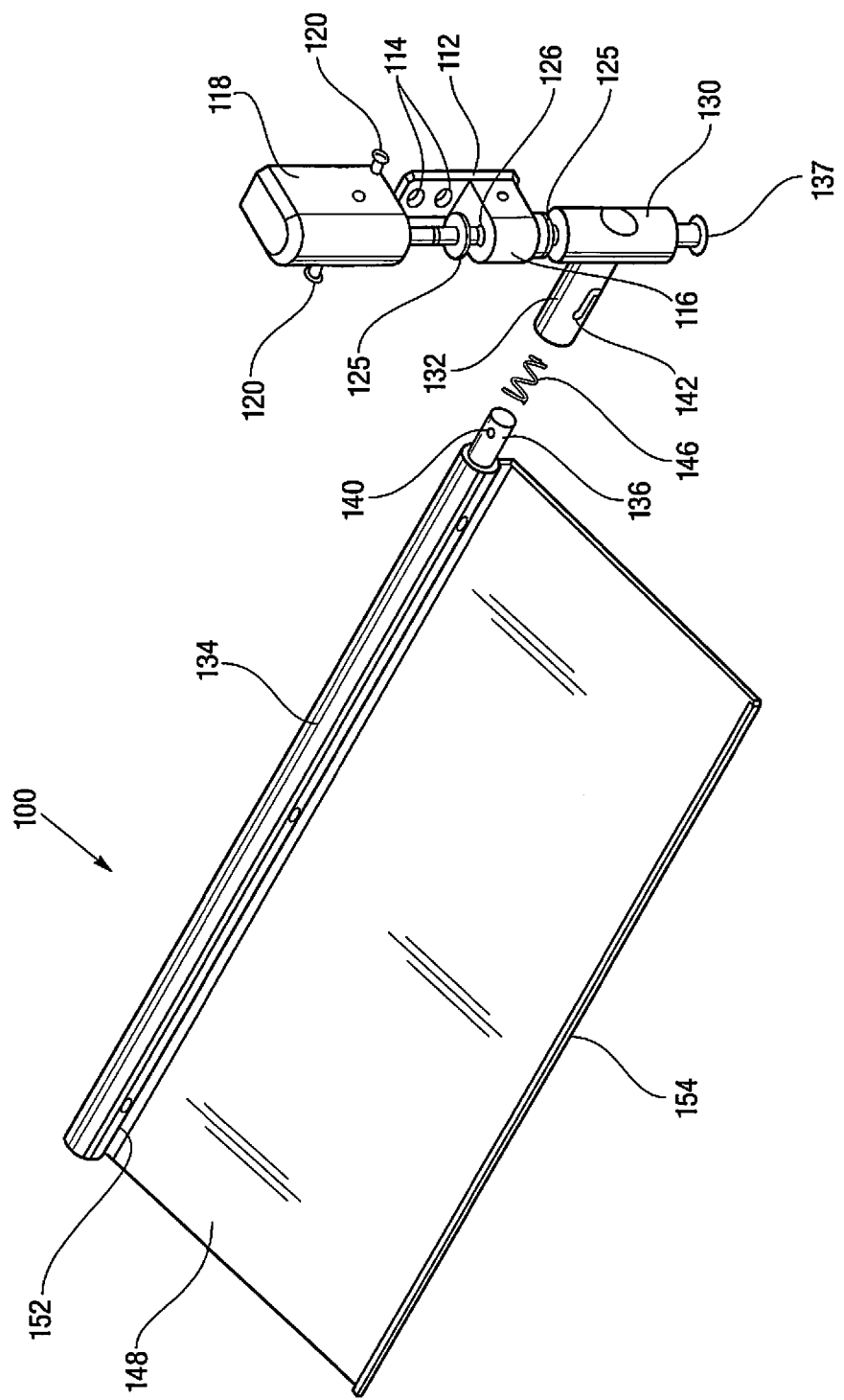
FIG. 15 is a perspective front exploded view of a shelf assembly in accordance with the subject disclosure.

The subject technology overcomes many of the prior art problems associated with use and storage of office equipment such as keyboards. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. It is understood that references to the figures such as horizontal, vertical, up, down, upward, downward, left, and right are with respect to the figures and not meant in a limiting sense.

Referring now to FIG. 1, a perspective front view of a shelf assembly 100 mounted to a wall 102 in accordance with the subject disclosure is shown. The shelf assembly 100 is particularly useful in dental offices where space is often limited. The shelf assembly 100 supports a keyboard 104 for easy access when in use (e.g., the operational orientation of FIGS. 1-7). When not needed, the shelf assembly 100 can be easily moved to a storage orientation (see FIGS. 8-14).

The keyboard 104 may remain fixed to the shelf assembly 100 or be removed in the storage orientation. Preferably, the keyboard 104 is wireless for communicating with a computer (not shown) so that desired images and actions may be shown on a monitor 106. The monitor 106 may be mounted on the wall 102, set on an adjacent counter, fixed to an articulating arm associated with a dental chair and the like.

Referring additionally to FIGS. 15-18, exploded views of the adjustable shelf 100 are shown. The adjustable shelf 100 includes a wall mount 110 for coupling to the wall 102. The wall mount 110 includes a mounting plate 112 that defines mounting holes 114. Fasteners (not shown) pass through the holes 114 into the wall 102 for fixing the shelf assembly 100 thereto. A mounting bracket 116 extends from the mounting plate 112.

A housing 118 enshrouds the wall mount 110 so that the wall mount 110 is hidden from view when the adjustable shelf 100 is fully assembled. One or more screws 120 pass through the housing 118 into a threaded hole 122 in the mounting bracket 116 for coupling the housing to the wall mount 110. The housing 118 extends from the wall 104 a certain depth "d" (see FIG. 17).

The housing 118 also includes a fixed post 124 extending along a first axis "a" downwardly through a central bore 126 in the mounting bracket 116. A post assembly 128 couples to the fixed post 124. The post assembly 128 has a tube 130 along the first axis "a." The tube 130 surrounds the fixed post 124 so that the tube freely rotates about the fixed post 124 (e.g., rotation about the first axis "a"). The fixed post 124 may include washers 125 and other features like a snap ring for spacing and retention within the tube 130.

The post assembly 128 also has a hollow arm 132 extending from the rotatable tube 128 along a second axis "b" substantially perpendicular to the first axis "a". It is envisioned that the first axis "a" and the second axis "b" are substantially vertical and horizontal, respectively, as well as parallel to the wall 102. An elongated shaft 134 rotatably couples within the hollow arm 132 and extends from the arm 132 along the second axis "b." The shaft 132 has a narrower portion 136 that fits within the arm 132. An end cap 137 is received in the rotatable tube 130 to make for a neat and tidy appearance.

Figure 16:
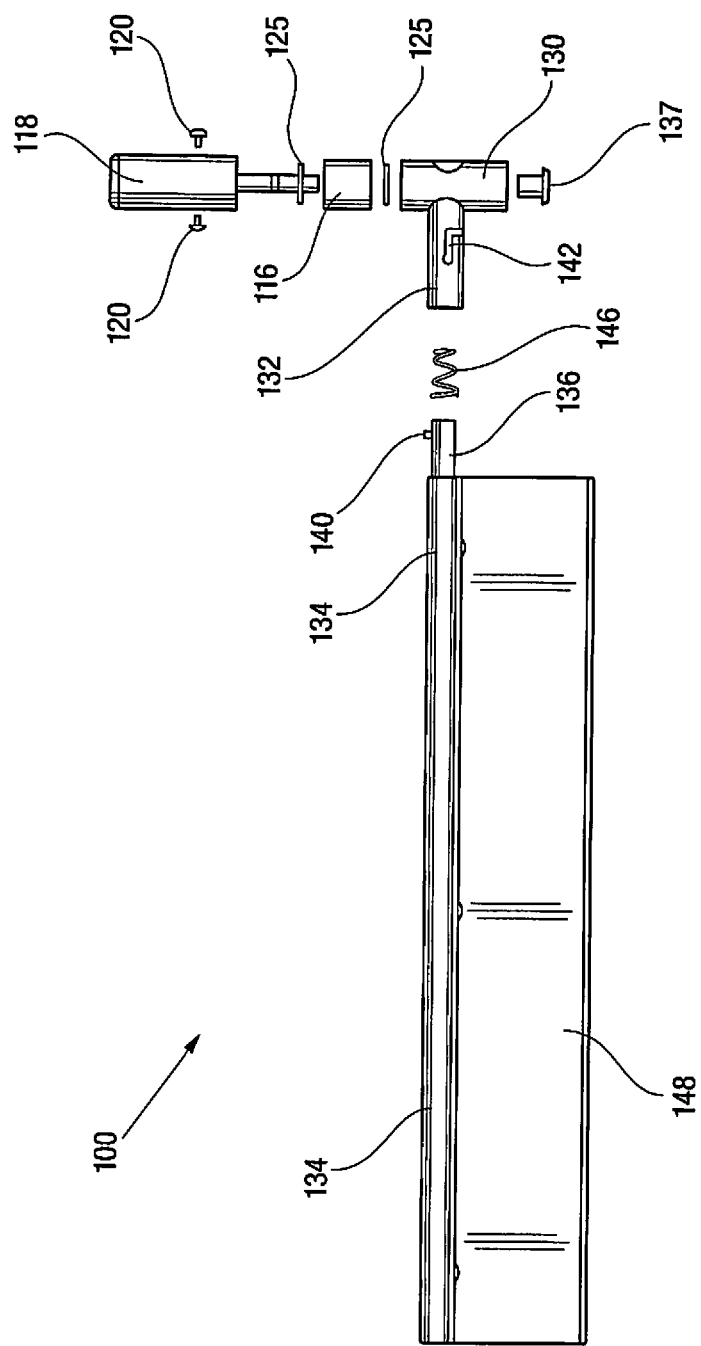
FIG. 16 is a front exploded view of a shelf assembly in accordance with the subject disclosure.
Figure 17:
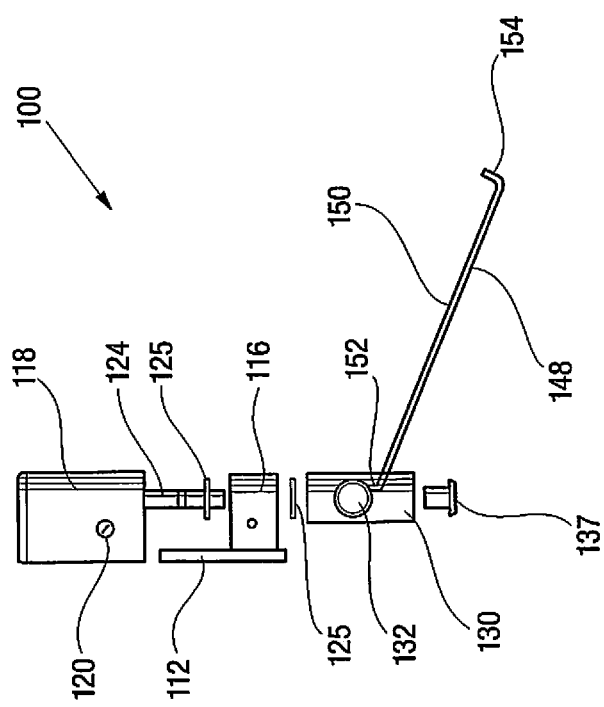
FIG. 17 is a left exploded view of a shelf assembly in accordance with the subject disclosure.
Figure 18:
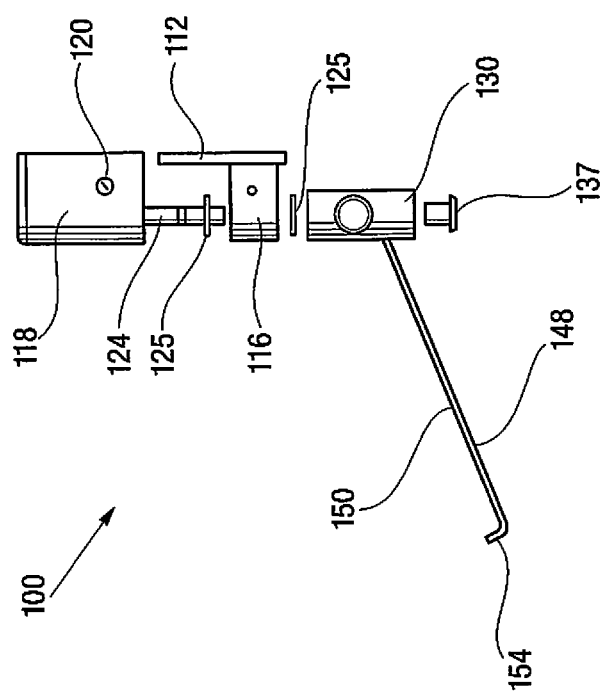
FIG. 18 is a right exploded view of a shelf assembly in accordance with the subject disclosure.

As best seen in FIG. 16, the shelf assembly 100 includes a locking assembly 138 for selectively setting the shelf assembly 100 in the operational orientation and the storage orientation. The locking assembly 138 includes a locking button 140 on the narrower portion 136 that interacts within a slot 142 defined in the hollow arm 132. The slot 142 is L-shaped with enlarged ends 144 that act as detents to capture the button 140. The enlarged ends 144 equate to the operational and storage orientations, respectively. A spring 146 fits within the hollow arm 132 to bias shaft 134 outward so that movement and positioning of the button 140 within the slot 142 is reliable and feels snug. In another embodiment, the end of the shaft 134 is hollow to define a slot and receive the arm and a button thereon.

A tray 148 is attached to the shaft 134 for rotation therewith. The tray 148 has an upper working surface 150 for mounting the keyboard 104 thereto. The keyboard 104 may be glue or screwed to the tray or simply rest thereupon. In the storage orientation, the tray 148 is substantially parallel to and within the certain depth "d" from the wall 102. Preferably, the keyboard 104 is also within or substantially within the depth as well. In the operational orientation, the tray 148 is at an angle α with respect to a third axis "c" coming perpendicularly out of the wall 102. The angle α is selected to present the keyboard 104 in a desirable position for use. The angle α may range from 0 to 65 degrees in the embodiment shown but any angle is possible, even negative angles (e.g., tilted upward coming away from the wall 102).

In other embodiments, the upper working surface 150 can be used to support charts, notebooks, notepads, computer keyboards, writing instruments, books, and/or other objects. For example, the working surface 150 may form a hole as a cupholder. Preferably, the upper working surface is dimensioned and configured to support a standard computer keyboard for a desktop computer, such as one having a footprint that is roughly 4-10 inches long by 12-22 inches wide. When the user no longer needs the working surface 150 provided by the tray 148, the user rotates the tray 148 to the storage orientation. In a dental setting, the storage orientation is useful for allowing the user, the patient or another person, to enter the work space and/or to move about more freely. Preferably, the tray 148 has a rear edge 152 secured to the shaft 134 and a front lip 154 for retaining whatever items may be on the tray 150.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., locking mechanisms, rotation mechanisms, fasteners, connections and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims. Additionally, various features may be included and disclaimed in a corresponding design patent application. For example without limitation, the housing, the tube, the shaft, the art and/or the tray may be shown in dashed lines to disclaim such ornamental features in a design patent application.

What is claimed is:

1. An adjustable shelf comprising:
   a wall mount for coupling to a wall;
   a fixed post extending downwardly from the wall mount along a first axis;
   a post assembly having a rotatable tube coupled to the fixed post so that the rotatable tube is rotatable about the first axis;
   an arm extending from the rotatable tube along a second axis substantially perpendicular to the first axis, wherein the first and second axis are substantially parallel to the wall;
   a shaft rotatably coupled to the arm and extending from the arm along the second axis, the shaft being rotatable about the second axis between an operational orientation and a storage orientation; and
   a tray extending from the shaft having: an upper working surface for supporting an item; a rear edge running along the second axis and secured to the shaft; and a front lip opposite the rear edge and offset from the second axis for retaining the item on the tray.

2. The adjustable shelf as recited in claim 1, further comprising a housing enshrouding the wall mount.

3. The adjustable shelf as recited in claim 1, further comprising a locking assembly for fixing the tray in the operational orientation.

4. The adjustable shelf as recited in claim 3, wherein the locking assembly fixes the tray in the storage orientation.

5. The adjustable shelf as recited in claim 3, wherein the lock assembly includes a locking button secured to one of: the shaft and the arm; and a slot defined on the other of: the shaft and the arm, the slot defining an operational detent for each orientation so that when the locking button is in one of the operational detents, the tray is fixed in the respective orientation.

6. The adjustable shelf as recited in claim 5, wherein the operational detent for the operational orientation sets the tray at a downward angle from the wall.

7. The adjustable shelf as recited in claim 1, wherein the wall mount extends from the wall a certain depth and, in the storage orientation, the tray is within the certain depth from the wall.

8. An adjustable shelf comprising:
   a wall mount for coupling to a wall, wherein the wall mount extends from the wall a certain depth;
   an elongated housing extending along a first axis and enshrouding the wall mount;

a fixed post extending downwardly from the wall mount along the first axis;

a post assembly having a rotatable tube coupled to the fixed post so that the rotatable tube is rotatable about the first axis;

a hollow arm extending from the rotatable tube along a second axis substantially perpendicular to the first axis, wherein the first and second axis are substantially parallel to the wall when in a storage orientation;

a shaft rotatably coupled within the hollow arm and extending from the arm along the second axis, the shaft being rotatable about the second axis between an operational orientation and the storage orientation;

a tray having an upper working surface extending from the shaft for mounting a keyboard thereto, wherein, in the storage orientation, the tray is substantially parallel to and within the certain depth from the wall and, in the operational orientation, the tray is at a downward angle with respect to the wall; and a locking assembly for selectively fixing the tray in the operational orientation and the storage orientation, wherein the locking assembly includes a locking button secured to one of: the shaft and the arm; and a slot defined on the other of: the shaft and the arm, the slot defining an operational detent so that when the locking button is in the operational detent, the tray is fixed in the operation orientation.

9. The adjustable shelf as recited in claim 8, wherein the tray has a rear edge secured to the shaft and a front lip for retaining the keyboard on the tray.

10. The adjustable shelf as recited in claim 8, wherein the slot defines a storage detent so that when the locking button is in the storage detent, the tray is fixed in the storage orientation.

11. The adjustable shelf as recited in claim 8, wherein the downward angle sets the tray slightly below horizontal.

12. The adjustable shelf as recited in claim 8, wherein the slot has a plurality of detents for setting two or more different operational orientations.

* * * * *